3,758,516
EPOXIDIZED HYDROCARBON AMIDES
John B. Siddall and Jean Pierre Calame, Palo Alto, Calif.,
assignors to Zoecon Corporation, Palo Alto, Calif.
No Drawing. Application Apr. 21, 1969, Ser. No. 818,130,
which is a continuation-in-part of application Ser. No.
618,339, Feb. 24, 1967, both now abandoned. Divided
and this application Mar. 19, 1971, Ser. No. 126,270
Int. Cl. C07d 1/20
U.S. Cl. 260—348 A          6 Claims

ABSTRACT OF THE DISCLOSURE

Hydrocarbon amides and N-substituted hydrocarbon amides containing at least 12 carbon atoms in the hydrocarbon backbone chain and alkyl substituents at the C–3, 7 and 11 positions and/or double bond unsaturation between C–2,3, C–6,7, and C–10,11, and/or substituents at at each of positions C–2,3,6,7,10 and 11 which are arthropod maturation inhibitors.

---

This is a division of application Ser. No. 818,130, filed Apr. 21, 1969, now abandoned, which in turn is a continuation-in-part of United States application Ser. No. 618,339, filed Feb. 24, 1967, now abandoned.

The present invention relates to novel organic compounds. The present invention more particularly pertains to long chain hydrocarbon amides having a chain length of up to 17 carbon atoms in the backbone, to certain unsaturated and substituted derivatives thereof, to certain intermediates therefor, and to methods for the preparation of such compounds.

The hydrocarbon amides of the present invention are represented by the following structural Formula A:

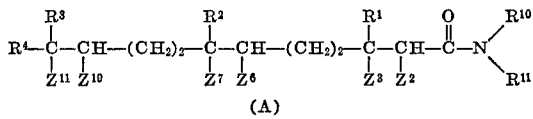

(A)

wherein each of $R^1$, $R^2$, $R^3$ and $R^4$ is lower alkyl; $Z^2$ is hydrogen, hydroxy and ethers thereof; $Z^3$ is hydrogen, hydroxy and esters and ethers thereof, bromo, chloro, fluoro, or when taken together with $Z^2$, is a carbon-carbon double bond between C–2,3 or one of the groups $>O$, $>CH_2$, $>CCl_2$ or $>CF_2$; provided that $Z^2$ is hydrogen when $Z^3$ is hydrogen; $Z^6$ is hydrogen, hydroxy and esters and ethers thereof, bromo, chloro or fluoro; $Z^7$ is hydrogen, hydroxy, and ethers and ethers thereof, bromo, chloro, fluoro, or, when taken together with $Z^6$, is a carbon-carbon double bond between C–6,7 or one of the groups $>O$, $>CH_2$, $>CCl_2$ or $>CF_2$; $Z^{10}$ is hydrogen, hydroxy, and esters and ethers thereof, bromo, chloro or fluoro; $Z^{11}$ is hydrogen, hydroxy, and esters and ethers thereof, bromo, chloro, fluoro, or, when taken together with $Z^{10}$, is a carbon-carbon double bond between C–10,11 or one of the groups $>O$, $>CH_2$, $>CCl_2$ or $>CF_2$; and each of $R^{10}$ and $R^{11}$ is hydrogen, alkyl, hydroxyalkyl, alkoxyalkyl, phenyl, or when taken together with the nitrogen atom to which they are attached, pyrrolidino, morpholino, piperidino, piperazine, or 4-(lower)-alkylpiperazino.

The term "alkyl" refers to straight or branched chain saturated aliphatic hydrocarbons having a chain length of from one to eight carbon atoms. Typical of such alkyl groups are methyl, ethyl, propyl, isopropyl, butyl, pentyl, hexyl and octyl including the various isomeric forms thereof. When qualified by the term "lower," the alkyl group has a chain length of no more than six carbon atoms. The terms "alkoxy" and "lower alkoxy" refer to straight chain alkyloxy groups of identical length such as methoxy, ethoxy, butoxy, and the like. The terms "hydroxyalkyl" and "lower hydroxyalkyl" refer to an alkyl group as defined above, substituted with one or two hydroxy groups. Typical hydroxyalkyls and lower hydroxyalkyls include hydroxymethyl, β-hydroxyethyl, 4-hydroxypentyl, and the like. The terms "alkoxyalkyl" and "lower alkoxyalkyl" refer to an alkyl group as defined above, substituted with one or two alkoxy groups. Typical groups include methoxymethyl, 2-methoxyethyl, 4-ethoxybutyl, and the like.

The term "hydroxy and esters and ethers thereof," as used herein, refers to free hydroxyl and esters and ethers which are hydrolyzable to free hydroxyl. Typical esters are carboxylic esters of up to 12 carbon atoms which are saturated or unsaturated and of straight chain aliphatic, branched chain aliphatic, and cyclic or cyclic aliphatic structure, such as acetate, propionate, butyrate, valerate, caproate, enanthate, pelargonate, acrylate, undecanoate, phenoxyacetate, benzoate, phenylacetate, diethylacetate, trimethylacetate, trichloroacetate, t - butylacetate, trimethylhexanoate, methylneopentylacetate, cyclohexylacetate, cyclopentylpropionate, admantoate, methoxyacetate, acetoxylacetate, aminoacetate, diethylaminoacetate, β-chloropropionate, 2-chloro-4-nitrobenzoate, piperidinoacetate, and the like, preferably a lower hydrocarbon carboxylic ester containing up to six carbon atoms. Typical ethers are followed by etherification of the hydroxy group by tetrahydrofuran-2-yl, tetrahydropyran-2-yl or by a monovalent hydrocarbon group of up to eight carbon atoms which can be of straight, branched, cyclic or cyclic aliphatic structure, such as alkyl, alkenyl, cycloalkyl or aralkyl, e.g. methyl, ethyl, propyl, butyl, pentyl, butenyl, phenethyl, benzyl, cyclopentyl, cyclohexyl, and the like.

Included within the scope of the above formula A are those compounds in which the amide grouping is unsubstituted ($R^{10}$=$R^{11}$=hydrogen), mono-substituted (one of $R^{10}$ and $R^{11}$=hydrogen), or disubstituted ($R^{10}$=$R^{11}$=other than hydrogen). Also included are those compounds in which each of positions C–3,7,11 contain a lower alkyl grouping ($R^1$, $R^2$, $R^3$, $R^4$), the C–11 carbon being thus disubstituted. In addition, each of hydrocarbon backbone positions C–2,3,6,7,10,11 can be variously elaborated ($Z^2$, $Z^3$, $Z^6$, $Z^7$, $Z^{10}$, $Z^{11}$) and are, independent of the other, unsubstitued (Z groups=hydrogen) or substituted (Z groups=other than hydrogen) with various groupings, including hydroxy, (lower)alkoxy, and halogen. Each of the pair of carbon atoms C–2,3, C–6,7 and C–10,11 can be linked by a single bond, a double bond or can contain a fused grouping, such as oxide, methylene, dichloromethylene and difluoromethylene. Where the backbone is elaborated by the addition of two or more halogen atoms, they are preferably the same.

The presence of at least one and optionally two or three double bonds in the foregoing compounds permits the existence of geometric isomerism in the configuration of these compounds. This isomerism occurs with regard to the double bond bridging the C–2,3 carbon atoms, the C–6,7 atoms, and the C–10,11 atoms. Obviously, isomerism at the C–10,11 carbon atoms occurs only when $R^3$ and $R^4$ are different alkyl groups.

Thus, the isomers are the cis and trans of the monoene series; the cis,cis; cis,trans; trans,cis; and trans,trans of the diene series; and the eight isomers of the triene series; each of which isomers in each series is included within the scope of this invention. Each of these isomers are separable from the reaction mixture by which they are prepared by virtue of their different physical properties via conventional techniques, such as chromatography, including thin layer and gas-liquid chromatography, as described in more detail hereinafter.

The compounds of Formula A are arthropod maturation inhibitors. They possess the ability to inhibit the maturation of members of the phylum Arthropoda, particularly insects, in the passage from one metamorphic stage to the next metamorphic stage. Thus, in the case of insects passing from the embryo stage to the larva stage, thence to the pupa stage and thence to the adult stage, contact with an effective amount of a compound of the present invention, at any of the first three stages, inhibits passage to the next developmental stage with the insect either repeating passage through its present stage or dying. Moreover, those compounds exhibit ovicidal properties with insects and are accordingly useful in combating them. These compounds are very potent and thus can be used at extremely low levels, for example, from $10^{-6}$ to $10^{-9}$ g. and are thus advantageously administered over large areas in quantities suitable for the estimated insect population. Generally, the substances are liquids and for the purposes herein described, they can be utilized in conjunction with liquid or solid carriers. Typical insects against which these compounds are effective include mealworm, housefly, bollweevil, cornborer, mosquito, cockroach, moth, and the like.

Although not intending to be limited by any theoretical explanation, it appears that the effectiveness of these derivatives can be traced to their ability to mimic the activity of certain so-called "juvenile hormone" substances, such as those described in U.S. Pat. Ser. No. 2,981,655 and Law et al., Proc. Nat. Acad. Sci. 55, 576 (1966). Juvenile hormone substances have been referred to as growth hormone also. Juvenile hormone was identified as methyl 10,11 - oxido - 7 - ethyl-3,11-trimethyltrideca-2,6-dienoate using an extract of cecropia moths by Roeller et al., Angew. Chem. Internat. Edit. 6, 179 (1967) and Chemical & Engineering News, 48–49 (Apr. 10, 1967). A second juvenile hormone from the same source has been identified as methyl 10,11-oxido-3,7,11-trimethyltrideca-2,6-dienoate by Meyer et al., "The Two Juvenile Hormones from the Cedropia Silk Moth," Zoology (Proc. N.A.S.) 60, 853 (1968). In addition to the natural juvenile hormones and the unidentified mixture of Law et al. above, some synthetic terpenoids have been reported exhibiting maturation inhibiting, sterility or ovicidal activity. Bowers et al., Life Sciences (Oxford) 4, 2323 (1965); BioScience, 18, No. 8, 791 (August 1968); Williams, Scientific American 217, No. 1, 13 (July 1967); Science 154, 248 (Oct. 14, 1966); Remanuk et. al., Proc. Nat. Acad. Sci. 57, 349 (1967); Masner et al., Nature 219, 395 (July 27, 1968); Canadian Pat. 795,805 (1968); and U.S. Pat. 3,429,970.

The compounds of the present invention can be prepared chemically according to the following illustrated sequence of reactions:

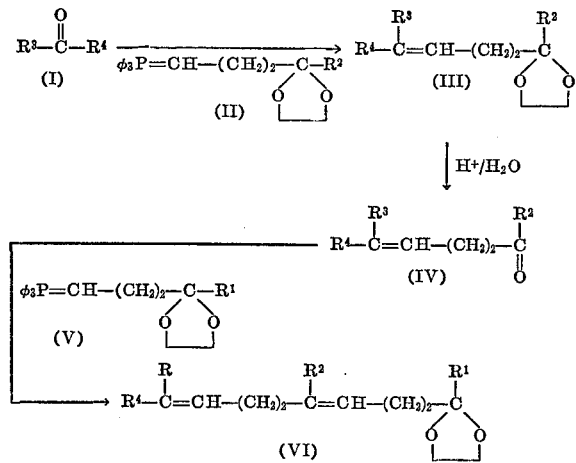

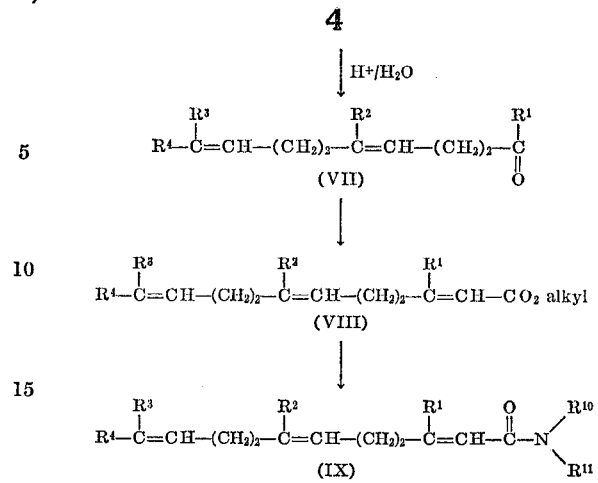

In the above scheme, each of $R^1$, $R^2$, $R^3$, $R^4$, $R^{10}$ and $R^{11}$ is as hereinbefore defined and the symbol $\phi$ represents phenyl.

With reference to the above reaction scheme (I→IX), the selected dialkylketone (I) is reacted with equal molar quantities and, preferably, an excess of the 4-ethylene ketal of the 4-alkylbutylidenetriphenylphosphorane Wittig reagent derivative (II) in organic reaction medium, such as is preferably provided by dimethylsulfoxide at reflux temperature to afford the corresponding substituted ethylenedioxyalkene Wittig reaction adduct (III). This process thus makes possible the union of hydrocarbon chains with concomitant formation of double bond unsaturation at the juncture.

In the above-described process, the 4-ethylene ketal of the 4-alkylbutylidenetriphenylphosphorane Wittig reagent is prepared by conventional procedures, such as is disclosed by Trippett, Advances in Organic Chemistry, vol. I., pp. 83–102; Trippett, Quarterly Review, vol. 16–17, pp. 406–410; and Greenwald et al., Journal of Organic Chemistry 28, 1128 (1963) from the 4-ethylene ketal of a 4-alkylbutyl halide (1-halo-4-alkanone) upon treatment thereof with triphenylphosphine and subjecting the resultant phosphonium halide to the action of butyl or phenyl lithium.

The 4-ethylene ketal of the 1-halo-4-alkanone is obtained by subjecting the 4-keto compound to conventional ketalysis with ethylene glycol in benzene in the presence of an aryl sulfonic acid. The latter 1-halo-4-alkanone, particularly the 1-bromo derivative, can be prepared by processes known per se, such as that described in German Pat. No. 801,276 (Dec. 28, 1950), vide Chemical Abstracts 45, 2972h and by Jager et al., Arch. Pharm. 293, 896 (1960), vide Chemical Abstracts 55, 3470g. Briefly, these procedures involve treating butyrolactone with the desired alkyl alkanoate to provide the corresponding α-acylbutyrolactone adduct therebetween. Treatment of the latter adduct with alkali metal halide, particularly sodium bromide, in aqueous sulfuric acid then provides the corresponding 1-bromo-4-alkanone. Thus, butyrolactone, when treated with ethyl acetate, gives α-acetylbutyrolactone which is, in turn, converted to 1-bromo-4-pentanone.

Hydrolysis of the Wittig reaction adduct (III) with aqueous acid affords the free ketone (IV).

By repeating the Wittig reaction just described on the thus-formed ketone (IV) with the Wittig reagent (V) (prepared as already described), the corresponding ethylene ketal diene adduct (VI) is obtained, which is, in turn, hydrolyzed with aqueous acid to the tetraalkyl substitutd hydrolyzed with aqueous acid to the tetraalkyl substituted nonadienone (VII).

Conversion of the thus-prepared compound (VII) to the tetraalkyl substituted undecatrienoate (VIII) follows: upon treatment with a diethyl carbalkoxymethylphosphonate, such as diethyl carbomethoxymethylphosphonate, in the presence of alkali metal hydride.

The novel acid amides represented by Formula IX and otherwise corresponding to the novel amides of the present invention represented by Formula A above are thereafter conveniently prepared by treating the trienoate ester (VIII) with a selected amine salt [prepared by treating the selected amide, such as ammonia or a mono- or disubstituted ($R^{10}$ and $R^{11}$) amine with butyl lithium in organic solvent, such as hexane, in the manner described by Cope et al., Journal of the American Chemical Society 80, 2850 (1958)] preferably in ether at room temperature giving the amide directly.

Alternatively, the amides hereof can be prepared by first converting the acid ester (VIII) to the corresponding acid or acid halide thereof, the acid halide, notably the chloride, being preferred. This process involves first hydrolyzing the ester with sodium carbonate in the presence of aqueous methanol. The acid chloride is then prepared by treating the free acid with phosphorus trichloride, phosphorus pentachloride, sulfonyl chloride, oxalyl chloride, and the like, at room temperature or gentle reflux with benzene being used as the solvent. The acid halide is thereafter treated with an excess of the selected amine in non-aqueous, inert organic solvent, generally at or about room temperature.

After the backbone hydrocarbon amide has thus been prepared, further optional elaboration of the molecule (represented in Formula A by groups $Z^2$, $Z^3$, $Z^6$, $Z^7$, $Z^{10}$ and $Z^{11}$) via certain preferred sequences, is conducted as follows.

The addition of the fused methylene (cyclopropyl) group to the unsaturated positions of the molecule can be performed selectively at C–2,3 by the reaction of the unsaturated compound with dimethylsulfoxonium methylide base [prepared in the manner of Corey et al., Journal of the American Chemical Eociety 87, 1353 (1965)] in dimethylsulfoxide. Addition of the fused methylene group at the C–6,7 and C–10,11 positions follows upon reaction of the unsaturated linkages with methylene iodide and a zinc-copper couple in the manner of Simmons and Smith, Journal of the American Chemical Society 81, 4256 (1959).

Similarly, the formation of the epoxide is selectively performed at the C–2,3 position by reaction with hydrogen peroxide in aqueous alkali medium, such as is usually provided by sodium hydroxide. Addition of the oxido group at the C–6,7 and C–10,11 position is performed with m-chloroperbenzoic acid, preferably in methylene chloride or chloroform solution.

The fused difluoromethylene group at positions C–6,7 and C–10,11 is added by reacting the starting monoene or diene with trimethyltrifluoromethyl tin in the presence of sodium iodide in benzene/monoglyme solvent at reflux over a period of a few hours. By varying the mole ratio of the two reactants and the temperature and time of reaction, the reaction can be favored toward one or the other mono adducts and the bis adduct.

The fused dichloromethylene group is introduced by reacting the monoene or diene (at C–6,7 and/or C–10,11) with phenyldichlorobromomethyl mercury in benzene at reflux for from one to five hours. Again, the relative yield of one or the other mono adducts and the bis adduct varies with the amount of mercury reagent and the reaction conditions employed. Generally, about or slightly more than one molar equivalent provides the mono adducts, the bis adduct being favored by use of two or more equivalents.

Hydrogenation of one or more of the double bonds to the corresponding saturated (carbon-carbon single bond) linkage ($Z^2=Z^3$=hydrogen, $Z^6=Z^7$=hydrogen, $Z^{10}=Z^{11}$=hydrogen) is conveniently performed in benzene over a 5% palladium catalyst on carbon support, halogen atoms being later introduced as described later.

The hydroxy, ether, such as lower alkoxy, and halo groups at one or more positions on the backbone chain as indicated by the above definitions relating to formula A are introduced via a number of methods.

At the C–2,3 positions, the monohydroxy substituent at C–2,3 ($Z^2$=hydrogen, $Z^3$=hydroxy) is introduced by first selectively forming the 2,3-oxido derivative as described above and thereafter opening the ring by treatment with a mole or less of lithium aluminum hydride under mild conditions, such as at temperatures of from 0° C. to about 30° C. for a short time.

Etherification is thereafter conducted by methods known per se. For example, the hydroxy group can be treated with sodium hydride followed by a hydrocarbon halide, e.g. an alkyl halide, such as ethyl bromide, to form the desired ether group, such as lower alkoxy. 2-halotetrahydropyran and 2-halotetrahydrofuran are utilized for the corresponding tetrahydropyran-2-yl and tetrahydrofuran-2-yl ethers. Acylation is likewise accomplished by known chemical processes, such as through the use of an acid anhydride in the presence of said catalyst, for example, p-toluenesulfonic acid.

The bis 2,3-dihydroxy compounds are prepared by treating the 2,3-oxido derivative with 0.1 to 0.001 N perchloric acid in aqueous solution at room temperature for about 18 hours. The 2-hydroxy-3-lower alkoxy compounds are formed by similar catalytic treatment of the epoxide with perchloric acid in the presence of an alkanol. The 2-hydroxy-3-halo compounds are prepared by treating the 2,3-epoxide with hydrogen halide, the 3-halo being the halogen of the acid used.

Each of the C–6,7 and C–10,11 positions are similarly elaborated. The monosubstituted derivatives ($Z^6=Z^{10}$=hydrogen) are prepared by treating the mono- or diene with aqueous sulfuric acid to afford the monohydroxy compounds ($Z^7$ and/or $Z^{11}$=hydroxy). Etherification and esterification thereof is performed as described above. The monohalo compounds ($Z^7$ and/or $Z^{11}$=halo) are prepared by similarly treating the unsaturated linkage with hydrogen halide, the halo substituent being the one of the acids employed. In the 6,10-diene or 2,6,10-triene series, if a halogenated hydrocarbon solvent, such as carbon tetrachloride, is used in this reaction, the mono 11-halo adduct is favored. By using an alternative solvent, such as an ether, e.g. diethyl ether, or hydrocarbon, e.g. benzene, this favoritism is upset and the 7-mono-, 11-mono- and 7,11-dihalo products are obtained.

The bishydroxy derivative ($Z^6=Z^7$=hydroxy and/or $Z^{10}=Z^{11}$=hydroxy) are prepared from the precursor epoxide (introduced as described above) with aqueous acid as set forth above. Similarly, the procedure given above in the insertion of the 6(10)-hydroxy-7(11)-alkoxy and 6(10)-hydroxy-7(11)-halo substituents analogously apply.

In the preparation of the 6(10)-bromo- and 6(10)-chloro-7(11)-hydroxy compounds, the starting unsaturated compound is treated with the appropriate quantity of N-bromo- or N-chlorosuccinimide in aqueous organic solvent, such as dioxane. The corresponding 7(11)-alkoxy compounds are similarly prepared in the presence of dry alkanol solvent. Use of hydrogen fluoride starting with the corresponding oxido compounds affords some of the 6(10)-fluoro-7(11)-hydroxy derivatives. Treatment thereof with acidified alkanol solution affords the corresponding lower alkoxy compounds.

The dihalo compounds ($Z^6=Z^7$=halo and/or $Z^{10}=Z^{11}$=halo)

are formed by treating the olefin with bromine, chlorino or fluorine in a chlorinated hydrocarbon solvent, such as chloroform and methylene chloride.

In the practice of the above described elaborations on the compounds hereof, relative sensitivities of various groups to certain reaction conditions dictates the preference for a general pattern of reaction sequence. Thus, in accordance herewith, the methyleneation reaction is usually performed initially on the triene. As mentioned, this can be done selectively.

The remaining sites of unsaturation are generally epoxidized as the next step. This is particularly true for epoxidations at the C–2,3 position for which it is preferred not to have present a halo substituent on the backbone chain. However, since the acidic conditions required for the addition of hydrogen halides cleave the epoxide, it is preferred to insert the oxide after such reactions are performed unless, of course, the epoxide is required for the insertion of the hydroxy (alkoxy)halo bis-substituents, and the like.

With the exception of the above proviso for the oxido group, the fused halomethylene groups are preferably introduced after the fused methylene and oxido groups are present since these reactions are compatible with these groups.

After all desired elaboration is complete, hydrogenation of any of the unsubstituted double bonds is, if desired, carried out. Halogenation in the instance of introducing a tertiary halo atom is preferably conducted on the desired olefin isolated after hydrogenation.

Certain exceptions to the above general and preferred sequence exist; however, upon slight modification of the reactions according to the purposes desired in the preparation of particular compounds embraced by the present invention, chemical obstacles are overcome. These modifications are, as a whole, obvious to one skilled in the art and/or apparent by the preparative procedures set forth in the examples contained hereinafter.

Separation of the various geometric isomers can be performed at any appropriate or convenient point in the overall process. An advantageous and particular synthetically valuable point at which isomers can be separated by chromatography, and the like, is at the conclusion of each step of the backbone synthesis, that is, after preparing each of the compounds represented by Formulas III, VI, and VIII. Another advantageous point includes that just after the selective addition of the methylene group at C–2,3.

Typical of the novel compounds of the present invention embraced by the term "long chain hydrocarbon amides" are those of the following formulas:

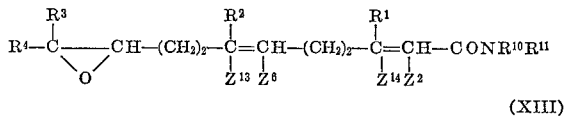

(XIII)

in which $R^1$–$R^4$, $R^{10}$, $R^{11}$, $Z^2$, $Z^6$ and $Z^{13}$ are as defined above and $Z^{14}$ is hydrogen, hydroxy and esters and ethers thereof, bromo, chloro, fluoro, or when taken together with $Z^2$, is a carbon-carbon double bond between C–2,3 or one of the groups $>O$, $>CCl_2$ or $>CF_2$

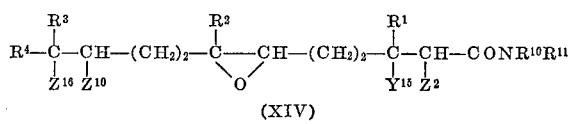

(XIV)

in which $R^1$–$R^4$, $R^{10}$, $R^{11}$, $Z^2$ and $Z^{10}$ are as defined above, $Z^{15}$ is hydrogen, hydroxy and esters and ethers thereof, bromo, chloro, fluoro, or, when taken together with $Z^2$, is a carbon-carbon double bond between C–2,3 or one of the groups $>CCl_2$ or $>CF_2$, and $Z^{16}$ is hydrogen, hydroxy and esters and ethers thereof, bromo, chloro, fluoro, or, when taken together with $Z^{10}$, is a carbon-carbon double bond between C–10,11, or one of the groups $>CCl_2$ or $>CF_2$;

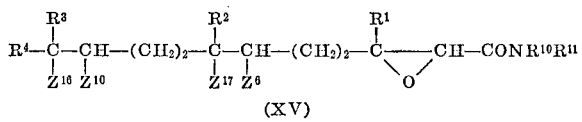

(XV)

in which $R^1$–$R^4$, $R^{10}$, $R^{11}$, $Z^6$, $Z^{10}$ and $Z^{16}$ are as defined above and $Z^{17}$ is hydrogen, hydroxy and esters and ethers thereof, bromo, chloro, fluoro, or, when taken together with $Z^6$, is a carbon-carbon double bond between C–6,7 or one of the groups $>CCl_2$ or $>CF_2$;

The following examples will serve to further typify the nature of this invention. As these are presented solely for the purpose of illustration, they should not be construed as a limitation on the scope of this invention. In some instances, for convenience, the various isomeric forms are specified; however, in any of the reaction steps, the carbon-carbon double bonds can be cis or trans independent of the other and, in fact, isomeric mixtures can be employed.

EXAMPLE 1

A suspension of sodium hydride (2.3 g., 0.1 mole) and benzene (50 ml.) is added to a solution of trans,trans 3,7,11-trimethyldodeca-2,6,10-trienoic acid (23.6 g., 0.1 mole) and benzene (100 ml.). The mixture is stirred for four hours. The mixture is cooled to 0° C. and oxalyl chloride (19.0 g., 0.15 mole) is added slowly over a period of one hour. The mixture is allowed to stand for three hours. To this mixture, which contains 3,7,11-trimethyldodeca-2,6,10-trienyl chloride, diethylamine (21.9 g., 0.3 mole) is added and the resulting mixture is allowed to stand for two hours at room temperature. The mixture is evaporated to dryness under reduced pressure. The residue is taken up in benzene, washed with an aqueous 5% sodium bicarbonate solution and water to neutrality, dried over sodium sulfate and evaporated to dryness to yield trans,trans N,N-diethyl 3,7,11-trimethyldodeca-2,6,10-trienamide.

By substituting the corresponding cis,trans; trans-cis; and cis,cis isomeric starting materials in the above process, there is obtained: cis,trans N,N-diethyl 3,7,11-trimethyldodeca-2,6,10-trienamide; trans,cis N,N-diethyl 3,7,11-trimethyldodeca-2,6,10-trienamide; and cis,cis N,N-diethyl 3,7,11-trimethyldodeca-2,6,10-trienamide.

EXAMPLE 2

Trans,trans 3,7,11-trimethyldodeca-2,6,10-trienoyl chloride (2.54 g., 10 mmoles), which is prepared according to the procedure described in Example 1, is added to 100 ml. of benzene, cooled to 0° C. and saturated with ammonia. The mixture is allowed to stand for one hour, then is washed with several portions of water, dried over sodium sulfate and evaporated to dryness under reduced pressure to yield trans,trans 3,7,11-trimethyldodeca-2,6,10-trienamide.

EXAMPLE 3

Trans,trans 3,7,11-trimethyldodeca-2,6-dienoyl chloride (2.56 g., 10 mmoles), prepared according to the procedure described in Example 1, is added to a solution of 1-ethylpiperazine (2.28 g., 20 mmoles) and tetrahydrofuran (20 ml.). The mixture is allowed to stand for four hours at 0° C.; then 50 ml. of benzene is added and the resulting mixture is washed with several portions of water, dried over sodium sulfate and evaporated to dryness to yield trans,trans N-(4'-ethylpiperazino) 3,7,11-trimethyldodeca-2,6-dienamide. The product is further purified by chromatography on alumina using benzene as a solvent.

Similarly, trans,trans N-piperidino 3,7,11-trimethyldodeca-2,6-dienamide can be prepared from trans,trans 3,7,11-trimethyldodeca-2,6-dienoyl chloride and piperazine.

EXAMPLE 4

Part A

To a solution of 20.9 g. of the ethylene ketal of 1-bromo-4-pentanone (obtained by treating 1-bromo-4-pentanone with ethylene glycol in benzene in the presence of p-toluene-sulfonic acid) in 100 ml. of benzene is added 20 g. of triphenylphosphine. This mixture is heated at reflux temperature for two hours and then filtered. The solid material thus collected is washed with benzene, dried in vacuo, and added to 6.49 g. of butyl lithium in 50 ml. of dimethylsulfoxide. This mixture is stirred until an orange solution is obtained and 3.8 g. of methyl ethyl ketone is then added. This mixture is stirred at about 25° C. for about eight hours, poured into water, and extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to yield a mixture of the cis and trans isomer of 6-methyl-5-octen-2-one which is separated by preparative gas-liquid chromatography into the individual isomers.

Part B

To a solution of 20.9 g. of the ethylene ketal of 1-bromo-4-pentanone in 100 ml. of benzene is added 20 g. of triphenylphosphine. This mixture is heated at reflux temperature for two hours and then filtered. The solid material thus collected is washed with benzene, dried in vacuo, and added to 6.49 g. of butyl lithium in 50 ml. of dimethylsulfoxide. This mixture is stirred until an orange solution is obtained and 5.5 g. of trans 6-methyl-5-octen-2-one (the ketone obtained in Part A) is then added. This mixture is stirred at about 25° C. for about eight hours, poured into water, and extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to furnish a mixture of the trans, trans and cis, trans isomers of 6,10-dimethyldodeca-5,9-dien-2-one which is separated by preparative gas-liquid chromatography to the individual isomers.

By repeating the above procedure with the exception of using cis 6-methyl-5-octen-2-one in place of trans 6-methyl-5-octen-2-one, there is obtained a mixture of the cis, cis and trans, cis isomers of 6,10-dimethyldodeca-5,9-dien-2-one which is separated as described above.

Similarly, in the above procedure, instead of using either the trans or cis isomer of 6-methyl-5-octen-2-one as the starting material, there can be used a mixture of the isomers obtained in Part A in which case a mixture of the four isomers is obtained which can then be separated by preparative gas-liquid chromatography into the four isomers.

Part C

A mixture of 11.2 g. of diethyl carbomethoxy methylphosphonate in 100 ml. of diglyme is treated with 2.4 g. of sodium hydride. This mixture is stirred until the evolution of gas ceases and 7.5 g. of trans, trans 6,10-dimethyldodeca-5,9-dien-2-one is then slowly added with stirring, maintaining a temperature below 30° C. The mixture is stirred for about 15 minutes and then diluted with water and extracted with ether. These ethereal extracts are washed well with water, dried over sodium sulfate, and evaporated to remove the solvent to furnish a mixture of the trans, trans, trans and cis, trans, trans isomers of methyl 3,7,11-trimethyltrideca-2,6,10-trienoate which is separated by preparative gas-liquid chromatography.

The above procedure is repeated with the exception of using cis, trans 6,10-dimethyldodeca-5,9-dien-2-one as the starting material in place of the trans, trans isomer and there is obtained a mixture of the cis, cis, trans and trans, cis, trans isomers of methyl 3,7,11-trimethyltrideca-2,6,10-trienoate.

Similarly, in the above procedure, in place of using either the trans, trans or cis, trans isomer of 6,10-dimethyldodeca-5,9-dien-2-one as the starting material, there can be used as the starting material a mixture of isomers obtained in Part B and thereafter separating each individual isomer by preparative gas-liquid chromatography.

In the examples which follow, in some instances the isomeric forms are not specified; however, in each of the procedure set forth in the following examples, reference to the compound or compounds named is inclusive of each isomer thereof isomeric mixtures thereof. In other words, the following examples are illustrative of procedures which are applicable to starting materials embracing individual isomers or isomeric mixtures.

EXAMPLE 5

By repeating the process of Example 4, with the exceptions that in Part A thereof, methyl ethyl ketone is replaced with the ketones listed in Colum V and the ketone thus-obtained is used in place of 6-methyl-5-octen-2-one in Part B, there is obtained the acid esters listed in column VI.

| V | VI |
|---|---|
| Acetone | Methyl 3,7,11-trimethyldodeca-2,6,10-trienoate. |
| Methyl n-propyl ketone | Methyl 3,7,11-tr methyltetradeca-2,6,10-trienoate. |
| Diethyl ketone | Methyl 3,7-dimethyl-11-ethyltrideca-2,6,10-trienoate. |
| Methyl i-propyl ketone | Methyl 3,7,11,12 tetramethyltrideca-2,6,10-trienoate. |
| Methyl n-butyl ketone | Methyl 3,7,11-trimethylpentadeca-2,6,10-trienoate. |
| Ethyl n-propyl ketone | Methyl 3,7-dimethyl-11-ethyltetradeca-2,6,10-trienoate. |
| Methyl t-butyl ketone | Methyl 3,7,11,12,12-pentamethyltrideca-2,6,10-trienoate. |
| Methyl i-butyl ketone | Methyl 3,7,11,13-tetramethyltetradeca-2,6,10-trienoate. |
| Methyl s-butyl ketone | Methyl 3,7,11,12-tetramethyltetradeca-2,6,10-trienoate. |
| Ethyl i-propyl ketone | Methyl 3,7,12-trimethyl-11-ethyltrideca-2,6,10-trienoate. |
| Methyl n-amyl ketone | Methyl 3,7,11-trimethylhexadeca-2,6,10-trienoate. |
| Ethyl n-butyl ketone | Methyl 3,7-dimethyl-11-ethylpentadeca-2,6,10-trienoate. |
| 3-ethyl-2-pentanone | Methyl 3,7,11-trimethyl-12-ethyltetradeca-2,6,10-trienoate. |
| Diisopropyl ketone | Methyl 3,7,12-trimethyl-11-(i-propyl)-trideca-2,6,10-trienoate. |
| Methyl n-hexyl ketone | Methyl 3,7,11-trimethylheptadeca-2,6,10-trienoate. |
| 5-Ethyl-3-heptanone | Methyl 3,7-dimethyl-11,12-diethyltetradeca-2,6,10-trienoate. |
| 4-Decanone | Methyl 3,7-dimethyl-11-(n-propyl)-heptadeca-2,6,10-trienoate. |
| Di-n-amyl ketone | Methyl 3,7-dimethyl-11-(n-amyl)-hexadeca-2,6,10-trienoate. |
| Di-n-hexyl ketone | Methyl 3,7-dimethyl-11-(n-hexyl)-heptadeca-2,6,10-trienoate. |

EXAMPLE 6

The process of Example 4 is repeated with the exception that in Part A thereof, 1-bromo-4-pentanone is replaced with the 1-bromo-4-ketones listed in Column VII to furnish the acid esters listed in Column VIII.

| VII | VIII |
|---|---|
| 1-bromo-4-hexanone | Methyl 3,11-dimethyl-7-ethyltri-deca-2,6,10-trienoate. |
| 1-bromo-4-heptanone | Methyl 3,11-dimethyl-7-(n-propyl)-trideca-2,6,10-trienoate. |
| 1-bromo-4-octanone | Methyl 3,11-dimethyl-7-(n-butyl)-trideca-2,6,10-trienoate. |
| 1-bromo-4-nonanone | Methyl 3,11-dimethyl-7-(n-amyl)-trideca-2,6,10-trienoate. |
| 1-bromo-5-methyl-4-hexanone | Methyl 3,11-dimethyl-7-(i-propyl)-trideca-2,6,10-trienoate. |
| 1-bromo-6-methyl-4-heptanone | Methyl 3,11-dimethyl-7-(i-butyl)-trideca-2,6,10-trienoate. |
| 1-bromo-5,5-dimethyl-4-hexanone | Methyl 3,11-dimethyl-7-(t-butyl)-trideca-2,6,10-trienoate. |

EXAMPLE 7

Part A

To a 15% solution of butyl lithium in hexane (420 ml.) is added at −10° C. with stirring, a solution of dry diethylamine (49 g.) in anhydrous ether (530 ml.). The mixture is then stirred for one hour at 20° C. to provide a 1 molar solution of diethylamino lithium.

Thereafter, an aliquot (50 ml.) of the thus-prepared solution is added to methyl 3,7,11-trimethyltrideca-2,6,10-trienoate (12.5 g.) in ether (50 ml.) and the mixture is stirred at room temperature for four hours. The mixture

11 is washed with an aqueous 0.1 N hydrochloric acid solution and water to neutrality, dried over sodium sulfate and evaporated to dryness to yield N,N-diethyl-3,7,11-trimethyltrideca-2,6,10-trienamide.

Part B

By repeating the procedure outlined in Part A hereof with the exception of replacing diethylamino with the amines listed in Column IX below, there is obtained the corresponding amides listed in Column X below.

| IX | X |
| --- | --- |
| Ammonia | 4,7,11-trimethyltrideca-2,6,10-trienamide. |
| Methylamine | N-methyl-3,7,11-trimethyltrideca-2,6,10-trienamide. |
| Ethylamine | N-ethyl-3,7,11-trimethyltrideca-2,6,10-trienamide. |
| Dimethylamine | N,N-dimethyl-3,7,11-trimethyltrideca-2,6,10-trienamide. |
| n-Propylamine | N-n-propyl-3,7,11-trimethyltrideca-2,6,10-trienamide. |
| Isopropylamine | N-isopropyl-3,7,11-trimethyltrideca-2,6,10-trienamide. |
| n-Butylamine | N-n-butyl-3,7,11-trimethyltrideca-2,6,10-trienamide. |
| t-Butylamine | N-t-butyl3,7,11-trimethyltrideca-2,6,10-trienamide. |
| n-Amylamine | N-n-amyl-3,7,11-trimethyltrideca-2,6,10-trienamide. |
| n-Hexylamine | N-n-hexyl-3,7,11-trimethyltrideca-2,6,10-trienamide. |
| Methylisopropylamine | N,N-methylisopropyl-3,7,11-trimethyltrideca-2,6,10-trienamide. |
| Ethylpropylamine | N,N-ethylpropyl-3,7,11-trimethyltrideca-2,6,10-trienamide. |
| Methylbutylamine | N,N-methylbutyl-3,7,11-trimethyltrideca-2,6,10-trienamide. |
| di-t-Butylamine | N,N-di-t-butyl-3,7,11-trimethyltrideca-2,6,10-trienamide. |
| Diisopropylamine | N,N-diisopropyl-3,7,11-trimethyltrideca-2,6,10-trienamide. |
| di-n-Butylamine | N,N-di-n-butyl-3,7,11-trimethyltrideca-2,6,10-trienamide. |
| Aniline | N-phenyl-3,7,11-trimethyltrideca-2,6,10-trienamide. |
| Diphenylamine | N,N-diphenyl-3,7,11-trimethyltrideca-2,6,10-trienamide, |
| 5-amino-1-pentanol | N-(5'-hydroxypentyl)-3,7,11-trimethyltrideca-2,6,10-trienamide, |
| 1-amino-2,3-propanediol | N-(2',3'-dihydroxypropyl)-3,7,11-trimethyltrideca-2,6,10-trienamide, |
| 2-(t-butylamino)-ethanol | N,N-(t-butyl),(2'-hydroxyethyl)-3,7,11-trimethyltrideca-2,6,10-trienamide, |
| 2-amino-1-methoxypropane. | N-(1'-methoxyprop-2'-yl)-3,7,11-trimethyltrideca-2,6,10-trienamide, |
| 2,2-dimethoxyethyl-amine. | N-(2',2'-dimethoxyethyl)-3,7,11-trimethyltrideca-2,6,10-trienamide, |
| di-(2-ethoxyethyl)-amine | N,N-diethyl-(2'-ethoxyethyl)-3,7,11-trideca-2,6,10-trienamide, |
| 2-methoxy-3-amino-hexane. | N-(methoxyhexan-3'-yl)-3,7,11-trimethyltrideca-2,6,10-trienamide, |
| 2-methoxyethylamine | N-2'-methoxyethyl-3,7,11-trimethyltrideca-2,6,10-trienamide, |
| Pyrrolidine | N,N-pyrrolidino-3,7,11-trimethyltrideca-2,6,10-trienamide, |
| Piperidine | N,N-piperidino-3,7,11-trimethyltrideca-2,6,10-trienamide, |
| Morpholine | N,N-morpholino-3,7,11-trimethyltrideca-2,6,10-trienamide, |
| Piperazine | N,N-piperazino-3,7,11-trimethyltrideca-2,6,11-trienamide, |
| 4-methylpiperazine | N,N-4'-methylpiperazino-3,7,11-trimethyltrideca-2,6,10-trienamide, |
| 4-ethylpiperazine | N,N-4'-ethylpiperazino-3,7,11-trimethyltrideca-2,6,10-trienamide. |

In the instances a hydroxyamine is employed, the appropriate amount of butyl lithium reagent is required.

Part C

By repeating the procedure outlined in Part A hereof with the exception of replacing methyl-3,7,11-trimethyltrideca-2,6,10-trienoate with the other acid esters obtained by the procedures of Examples 4, 5 and 6 there are obtained the corresponding N,N-diethylamides thereof, for example:

N,N-diethyl-3,7,11-trimethyldodeca-2,6,10-trienamide,
N,N-diethyl-3,11-dimethyl-7-ethyltrideca-2,6,10-trienamide,
N,N-diethyl-3,11-dimethyl-7-ethyldodeca-2,6,10-trienamide,
N,N-diethyl-7,11-dimethyl-3-ethyldodeca-2,6,10-trienamide,

12

N,N-diethyl-3,7-diethyl-11-methyltrideca-2,6,10-trienamide,
and so forth.

Part D

By repeating the procedure as outlined in Part C hereof with the exception of replacing diethylamine with the amines listed in Column IX of Part B hereof, the corresponding substituted amides thereof are prepared, for example:

3,7,11-trimethyltrideca-2,6,10-trienamide,
N-methyl-3,7,11-trimethyltrideca-2,6,10-trienamide,
N-methyl-3,11dimethyl-7-ethyltrideca-2,6,10-trienamide,
and the like, N,N-dimethyl-3,7,11-trimethyltrideca-2,6,10-trienamide,
N,N-dimethyl-3,11-dimethyl-7-ethyltrideca-2,6,10-trienamide, and so forth.

It will be understood that the various geometric isomers of the above compounds, as set forth in Example 4 above for the starting compounds and as mentioned in the last paragraph of Example 4, Part C above, are analogously prepared.

EXAMPLE 8

To a mixture of 2 g. of NN,-diethyl-3,7,11-trimethyltrideca-2,6,10-trienamide in 150 ml. of methylene chloride at 0° C., there is slowly added 1.0 molar equivalents of m-chloroperbenzoic acid in 100 ml. of methylene chloride. The resulting mixture is then allowed to stand for five minutes at 0° C. and then washed with a 2% aqueous sodium sulfite solution, a 5% aqueous sodium bicarbonate solution, and with water, dried over sodium sulfate, and evaporated to an oil which contains a mixture of the 6,7-oxido, 10,11-oxido, and a small amount of the 6,7;10,11-dioxide derivatives of N,N-diethyl-3,7,11-trimethyltrideca-2,6,10-trienamide which are then purified and separated into the individual 6,7-oxido, 10,11-oxido, and 6,7;10,11-dioxido derivatives by chromatography on silica.

In like manner, the corresponding three epoxide products of each of N,N-diethyl-3,7,11-trimethyldodeca 2,6, 10-trienamide and N,N-diethyl-3,11-dimethyl-7-ethyl-trideca-2,6,10-trienamide are prepared and separated by silica chromatography. Similarly, the corresponding epoxides of the other hydrocarbon amides obtained as described in Example 7 are prepared, namely, the three epoxide derivatives of 3,7,11-trimehtyltrideca-2,6,10-trienamide, N - methyl-3,7,11-trimethyltrideca-2,6,10-trienamide, N - methyl - 3,11-dimethyl-7-ethyltrideca-2,6,10-trienamide, and the like, N-ethyl-3,7,11-trimethyltrideca-2,6,10 - trienamide, N - ethyl - 3,7,11-trimethyldodeca-2, 6,10-trienamide, N-ethyl-3,7,11-dimethyl-7-ethyltrideca-2, 6,10-trienamide, and the like, N,N-dimethyl-3,7,11-trimethyltrideca - 2,6,10 - trienamide, N,N-dimethyl-3,7,11-trimethyldodeca - 2,6,10 - trienamide, N,N-dimethyl-3,11-dimethyl - 7 - ethyltrideca-2,6,10-trienamide, and the like, N-n-propyl - 3,7,11 - trimethyltrideca-3,6,10-trienamide, and the like, N-isopropyl-3,7,11-trimethyltrideca-2,6,10-trienamide, and so forth.

EXAMPLE 9

To a stirred solution of 5 g. of N,N-diethyl-3,7,11-trimethyltrideca-2,6,10-trienamide in 350 ml. of methanol is added 20 ml. of 4 N aqueous sodium hydroxide and 20 ml. of 30% hydrogen peroxide, maintaining a temperature of approximately 15° C. The solution is allowed to stand at 0° C. for 15 hours and then poured into ice water. The oil which forms is collected by filtration, washed with water, and dried to yield N,N-diethyl-2,3-oxido-3,7,11-trimethyltrideca-6,10-dienamido which may be further purified by recrystallization from acetone:hexane.

In like manner, N,N-diethyl-2,3-oxido-3,7,11-trimethyldodeca-6,10-dienamide and N,N-diethyl-2,3-oxido-3,11- dimethyl - 7 - ethyltrideca - 6,10-dienamide are prepared. Similarly, the corresponding 2,3-oxido derivatives of the other hydrocarbon amides obtained as described in Example 7 are prepared.

What is claimed is:

1. A compound selected from those of the following Formula XIII:

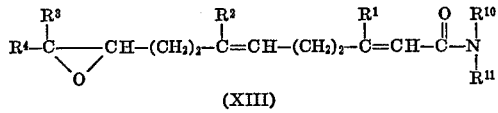

(XIII)

wherein each of $R^1$, $R^2$, $R^3$ and $R^4$ is lower alkyl and each of $R^{10}$ and $R^{11}$ is hydrogen or lower alkyl.

2. A compound according to claim 1 wherein each of $R^1$, $R^2$, $R^3$ and $R^4$ is methyl.

3. A compound according to claim 1 wherein each of $R^1$, $R^2$ and $R^3$ is methyl and $R^4$ is ethyl.

4. A compound according to claim 3 wherein each of $R^{10}$ and $R^{11}$ is ethyl.

5. A compound according to claim 1 wherein each of $R^1$ and $R^3$ is methyl and each of $R^2$ and $R^4$ is ethyl.

6. A compound according to claim 5 wherein $R^{10}$ is hydrogen and $R^{11}$ is ethyl.

No references cited.

NORMA S. MILESTONE, Primary Examiner

U.S. Cl. X.R.

260—240 H, 247.7 K, 293.89, 268 C, 326.8, 404, 943, 340.9, 587, 593 R; 424—320, 250, 248, 267, 274, 278, DIG.12